(12) United States Patent
Wu et al.

(10) Patent No.: US 11,935,260 B1
(45) Date of Patent: Mar. 19, 2024

(54) METHOD AND APPARATUS FOR MEASURING DIMENSIONS, AND COMPUTER-READABLE STORAGE MEDIUM

(71) Applicant: CONTEMPORARY AMPEREX TECHNOLOGY CO., LIMITED, Ningde (CN)

(72) Inventors: Tianhui Wu, Ningde (CN); Fei Chen, Ningde (CN); Guannan Jiang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/187,729

(22) Filed: Mar. 22, 2023

Related U.S. Application Data

(63) Continuation of application No. PCT/CN2022/117977, filed on Sep. 9, 2022.

(51) Int. Cl.
*G06T 7/60* (2017.01)
*G06T 7/80* (2017.01)

(52) U.S. Cl.
CPC .................. *G06T 7/60* (2013.01); *G06T 7/80* (2017.01); *G06T 2207/30164* (2013.01); *G06T 2207/30244* (2013.01)

(58) Field of Classification Search
CPC ... G06T 7/60; G06T 7/80; G06T 2207/30164; G06T 2207/30244
See application file for complete search history.

(56) References Cited

U.S. PATENT DOCUMENTS 9,858,684 B2 * 1/2018 Kim ........................ G06T 7/85
2016/0232678 A1 * 8/2016 Kurz ..................... G06T 19/006
(Continued)

FOREIGN PATENT DOCUMENTS

| CN | 108844462 A | 11/2018 |
|---|---|---|
| CN | 112884847 A | 6/2021 |

(Continued)

OTHER PUBLICATIONS

Wang, Jiannan "3-D Dimension Measurement of Workpiece Based on Binocular Vision" ICIRA (Year: 2019).*
(Continued)

*Primary Examiner* — Molly Wilburn
(74) *Attorney, Agent, or Firm* — Ladas & Parry LLP

(57) ABSTRACT

This application provides a method for measuring dimensions to reduce measurement time and improve production efficiency, including: obtaining a first image and a second image of a to-be-measured workpiece, where the first image and the second image are images captured by a first camera and a second camera at different positions respectively; extracting a first corner set of the to-be-measured workpiece from the first image and a second corner set of the to-be-measured workpiece from the second image separately; rectifying position coordinates of the first corner set and position coordinates of the second corner set to obtain a position coordinate value of the first corner set and a position coordinate value of the second corner set in a same coordinate system; and obtaining dimensions of the to-be-measured workpiece based on the position coordinate value of the first corner set and the position coordinate value of the second corner set.

13 Claims, 5 Drawing Sheets

(56) References Cited

U.S. PATENT DOCUMENTS

2017/0150129 A1\* 5/2017 Pangrazio ............ H04N 13/239
2017/0221226 A1\* 8/2017 Shen ........................ G06T 7/80

FOREIGN PATENT DOCUMENTS

| CN | 114136217 B | 5/2022 |
|---|---|---|
| EP | 3901911 A1 | 10/2021 |
| JP | 2019132709 A | 8/2019 |

OTHER PUBLICATIONS

Reichner, Robin "Robot based 3D scanning and recognition of workpieces" (Year: 2011).\*

International Search Report for International Application PCT/CN2022/117977, dated May 12, 2023.
Written Opinion of International Search Authority for International Application PCT/CN2022/117977, dated May 12, 2023.
Yang, Yu, Research on dimensional measurement method of continuous casting slab based on binocular stereo vision, Chinese Master's Theses Full-text Database Engineering Science and Technology I (Monthly) Issue 06, Jun. 15, 2022 (Jun. 15, 2022) B023-155, ISSN: 1674-0246, p. 7-63 of the main text (with English abstract).
Tang, Zhihao, Research on Measurement Technology Based on Binocular Stereo Vision, Chinese Master's Theses Full-text Database Engineering Science and Technology I (Monthly) Issue 05, Jun. 15, 2022 (Jun. 15, 2022) 1138-1084, ISSN: 1674-0246, p. 9-63 of the main text (with English Abstract).
Extended European Search Report for EP Application No. 22871134.7, dated Dec. 5, 2023.

\* cited by examiner

METHOD AND APPARATUS FOR MEASURING DIMENSIONS, AND COMPUTER-READABLE STORAGE MEDIUM

CROSS REFERENCE TO RELATED APPLICATION

This application is a continuation of International Patent Application No. PCT/CN2022/117977, filed on Sep. 9, 2022, the disclosure of which is incorporated by reference in its entirety.

TECHNICAL FIELD

This application relates to the field of machine vision, and in particular, to a method and apparatus for measuring dimensions, and a computer-readable storage medium.

BACKGROUND

With the development of technology in the field of machine vision, two common types of machine vision, that is, a monocular vision system and a binocular vision system, have been developed. Due to a limited field-of-view of a camera, the monocular vision system primarily serves to measure the dimensions of small-sized workpieces while the binocular vision system may serve to measure the dimensions of large-sized workpieces. In the binocular vision system, two cameras are primarily used for image acquisition, and the shooting fields of the two cameras are required to overlap, so that images captured by the two cameras can be spliced and calculated subsequently to obtain the dimensions of the corresponding workpiece.

However, the method for measuring the dimensions of a workpiece by using a binocular vision system leads to low production efficiency of the workpiece.

SUMMARY

This application provides a method and apparatus for measuring dimensions, and a computer-readable storage medium to reduce the measurement time and improve production efficiency.

According to a first aspect, a method for measuring dimensions is provided. The method includes: obtaining a first image and a second image of a to-be-measured workpiece, where the first image and the second image are images captured by a first camera and a second camera at different positions respectively; extracting a first corner set of the to-be-measured workpiece from the first image and a second corner set of the to-be-measured workpiece from the second image separately; rectifying position coordinates of the first corner set and position coordinates of the second corner set to obtain a position coordinate value of the first corner set and a position coordinate value of the second corner set in a same coordinate system; and obtaining dimensions of the to-be-measured workpiece based on the position coordinate value of the first corner set and the position coordinate value of the second corner set.

In the technical solution of this application, the position coordinates of the extracted corner points are rectified directly, and subsequently, the dimensions of the to-be-measured workpiece can be determined directly based on the rectified corner position coordinates in the same coordinate system, thereby avoiding the image rectification and stitching processes, and in turn, reducing the dimension measurement time and improving the production efficiency.

In some possible implementations, the first image and the second image are images of a first region and a second region of the to-be-measured workpiece in a first direction respectively. The first corner set is a set of corners of the first region. The second corner set is a set of corners of the second region. The obtaining dimensions of the to-be-measured workpiece based on the position coordinate value of the first corner set and the position coordinate value of the second corner set includes: obtaining a dimension of the to-be-measured workpiece in the first direction based on the position coordinate value of the first corner set and the position coordinate value of the second corner set.

In the above implementations, the dimension of the to-be-measured workpiece in the first direction, for example, a length dimension of a battery cell in an extension direction of a long side of the battery cell, is determined based on the position coordinate value of the corners of the two regions of the to-be-measured workpiece. The dimensions are calculated directly based on the position coordinate value, thereby significantly reducing the measurement time and improving the production efficiency.

In some possible implementations, the first corner set includes two corners of the first region in a second direction. The second corner set includes two corners of the second region in the second direction. The second direction is perpendicular to the first direction. The obtaining dimensions of the to-be-measured workpiece based on the position coordinate value of the first corner set and the position coordinate value of the second corner set includes: obtaining a dimension of the to-be-measured workpiece in the second direction based on position coordinate values of the two corners of the first region in the second direction and/or position coordinate values of the two corners of the second region in the second direction.

In the above implementations, the dimension of the to-be-measured workpiece in the second direction, for example, a width dimension of a battery cell in an extension direction of a short side of the battery cell, can be determined based on the position coordinate value of the corners of at least one region of the to-be-measured workpiece. The dimensions are calculated directly based on the position coordinate value, thereby significantly reducing the measurement time and improving the production efficiency.

In some possible implementations, the rectifying position coordinates of the first corner set and position coordinates of the second corner set includes: obtaining rectification parameters of the first camera and the second camera based on a first calibration target image, a second calibration target image, and calibration target parameters, where the first calibration target image is an image captured by the first camera by photographing a calibration target that includes a calibration pattern, and the second calibration target image is an image captured by the second camera by photographing the calibration target that includes the calibration pattern; and rectifying the position coordinates of the first corner set and the position coordinates of the second corner set separately based on the rectification parameters.

In the above implementations, the first camera and the second camera are calibrated by using the calibration target, so as to obtain the rectification parameters, such as a distortion parameter of the camera. In this way, the position coordinates of the corners are rectified without a need to rectify the image, thereby avoiding an image rectification process, greatly reducing the measurement time and improving the production efficiency.

In some possible implementations, the calibration pattern is a solid circle array pattern and/or a chessboard pattern.

In the above implementations, the calibration pattern may be one or more patterns, and can be compatible with to-be-measured workpieces of different sizes and models, thereby improving the production efficiency.

In some possible implementations, the calibration target is a calibration target obtained by changing a first parameter of the solid circle array pattern based on the dimensions of the to-be-measured workpiece. The first parameter includes at least one of a diameter of a solid circle, a center distance between adjacent solid circles, or a number of solid circles.

In the above implementation, the parameters of the calibration pattern may be set at discretion based on the dimensions of the to-be-measured workpiece. The calibration target can adapt to the to-be-measured workpieces of different dimensions and models by changing the diameter of the solid circle, the center distance between adjacent solid circles, the number of solid circles, and the like. The dimensions are measured after the camera is calibrated by using an appropriate calibration target, thereby reducing the measurement time and improving the production efficiency.

In some possible implementations, the rectification parameters include an intrinsic parameter and an extrinsic parameter of the first camera as well as an intrinsic parameter and an extrinsic parameter of the second camera. The intrinsic parameter of the first camera is a parameter corresponding to features of the first camera. The extrinsic parameter of the first camera is a position parameter of the first camera relative to the second camera. The intrinsic parameter of the second camera is a parameter corresponding to features of the second camera. The extrinsic parameter of the second camera is a position parameter of the second camera relative to the first camera.

In the above implementations, the principles of obtaining the rectification parameters used for rectification are provided by defining the intrinsic parameters and extrinsic parameters of the cameras, thereby facilitating subsequent measurement of dimensions.

In some possible implementations, the to-be-measured workpiece is a battery cell of a power battery, and the method is used to measure a length dimension and a width dimension of the battery cell.

In the above implementations, the to-be-measured workpiece is a battery cell, and the length and width of the battery cell need to be measured. When the above method is used to measure the dimensions of the battery cell, the measurement time of the battery cell is shortened, and the production efficiency of the battery cell is improved.

In some possible implementations, the same coordinate system is the world coordinate system.

In the above implementations, it is set that the same coordinate system is the world coordinate system, and the calculations are performed in the same world coordinate system, thereby improving the measurement precision.

According to a second aspect, a method for measuring dimensions is provided. The method includes: obtaining a first image and a second image of a to-be-measured workpiece, where the first image and the second image are images captured by a first camera and a second camera at different positions respectively; rectifying the first image and the second image separately to obtain a first rectified image and a second rectified image; extracting corners of the to-be-measured workpiece from the first rectified image and the second rectified image separately; and obtaining dimensions of the to-be-measured workpiece based on the corners of the to-be-measured workpiece in the first rectified image and the second rectified image.

In the technical solution provided in this application, the two images are rectified separately, and the dimensions are calculated after the corners in the rectified images are extracted separately, thereby avoiding an image stitching process, reducing the measurement time, and improving the production efficiency.

In some possible implementations, the obtaining dimensions of the to-be-measured workpiece based on the corners of the to-be-measured workpiece in the first rectified image and the second rectified image includes: determining dimensions of an overlap between the first rectified image and the second rectified image; and determining the dimensions of the to-be-measured workpiece based on the corners of the to-be-measured workpiece in the first rectified image, the corners of the to-be-measured workpiece in the second rectified image, and the dimensions of the overlap.

In the above implementations, the dimensions of the overlap are obtained, and therefore, the dimensions of the overlap can be directly subtracted in the subsequent calculation without a need to stitch the images, thereby reducing the measurement time and improving the production efficiency.

In some possible implementations, the extracting corners of the to-be-measured workpiece from the first rectified image and the second rectified image separately and obtaining dimensions of the to-be-measured workpiece based on the corners of the to-be-measured workpiece in the first rectified image and the second rectified image include: determining an overlap between the first rectified image and the second rectified image; cropping the first rectified image and the second rectified image based on the overlap; extracting the corners of the to-be-measured workpiece from the cropped first rectified image and the corners of the to-be-measured workpiece from the cropped second rectified image separately; and determining the dimensions of the to-be-measured workpiece based on the corners of the to-be-measured workpiece in the cropped first rectified image and the corners of the to-be-measured workpiece in the cropped second rectified image.

In the above implementations, the images are cropped, and the dimensions are calculated after the corners are extracted from the two cropped rectified images separately, thereby reducing the measurement time and improving the production efficiency.

In some possible implementations, the first image and the second image are images of a first region and a second region of the to-be-measured workpiece in a first direction respectively. The corners of the to-be-measured workpiece in the first rectified image include a first corner set of the first region, and the corners of the to-be-measured workpiece in the second rectified image include a second corner set of the second region. The obtaining dimensions of the to-be-measured workpiece based on the corners of the to-be-measured workpiece in the first rectified image and the second rectified image includes: obtaining a dimension of the to-be-measured workpiece in the first direction based on the first corner set and the second corner set.

In the above implementations, the dimension of the to-be-measured workpiece in the first direction, for example, a length dimension of a battery cell in an extension direction of a long side of the battery cell, is calculated based on the corners of the two regions of the to-be-measured workpiece, thereby significantly reducing the measurement time and improving the production efficiency.

In some possible implementations, the first corner set includes two corners of the first region in a second direction. The second corner set includes two corners of the second region in the second direction. The second direction is perpendicular to the first direction. The obtaining dimensions of the to-be-measured workpiece based on the corners of the to-be-measured workpiece in the first rectified image and the second rectified image includes: obtaining a dimension of the to-be-measured workpiece in the second direction based on the two corners of the first region in the second direction and/or the two corners of the second region in the second direction.

In the above implementations, the dimension of the to-be-measured workpiece in the second direction, for example, a width dimension of a battery cell in an extension direction of a short side of the battery cell, can be determined based on the corners of at least one region of the to-be-measured workpiece, thereby significantly reducing the measurement time and improving the production efficiency.

In some possible implementations, the rectifying the first image and the second image separately includes: obtaining rectification parameters of the first camera and the second camera based on a first calibration target image, a second calibration target image, and calibration target parameters, where the first calibration target image is an image captured by the first camera by photographing a calibration target that includes a calibration pattern, and the second calibration target image is an image captured by the second camera by photographing the calibration target that includes the calibration pattern; and rectifying the first image and the second image separately based on the rectification parameters.

In the above implementations, the first camera and the second camera are calibrated by using the calibration target, so as to obtain the rectification parameters, such as a distortion parameter of the camera. In this way, the two images are rectified without a need to stitch the images, thereby greatly reducing the measurement time and improving the production efficiency.

In some possible implementations, the calibration pattern is a solid circle array pattern and/or a chessboard pattern.

In the above implementations, the calibration pattern may be one or more patterns, and can be compatible with to-be-measured workpieces of different sizes and models, thereby improving the production efficiency.

In some possible implementations, the calibration target is a calibration target obtained by changing a first parameter of the solid circle array pattern based on the dimensions of the to-be-measured workpiece. The first parameter includes at least one of a diameter of a solid circle, a center distance between adjacent solid circles, or a number of solid circles.

In the above implementation, the parameters of the calibration pattern may be set at discretion based on the dimensions of the to-be-measured workpiece. The calibration target can adapt to the to-be-measured workpieces of different dimensions and models by changing the diameter of the solid circle, the center distance between adjacent solid circles, the number of solid circles, and the like. The dimensions are measured after the camera is calibrated by using an appropriate calibration target, thereby reducing the measurement time and improving the production efficiency.

In some possible implementations, the rectification parameters include an intrinsic parameter and an extrinsic parameter of the first camera as well as an intrinsic parameter and an extrinsic parameter of the second camera. The intrinsic parameter of the first camera is a parameter corresponding to features of the first camera. The extrinsic parameter of the first camera is a position parameter of the first camera relative to the second camera. The intrinsic parameter of the second camera is a parameter corresponding to features of the second camera. The extrinsic parameter of the second camera is a position parameter of the second camera relative to the first camera.

In the above implementations, the principles of obtaining the rectification parameters used for rectification are provided by defining the intrinsic parameters and extrinsic parameters of the cameras, thereby facilitating subsequent measurement of dimensions.

In some possible implementations, the relative position is obtained based on the images of the same calibration target photographed by the first camera and the second camera.

In the above implementations, the relative position between the two cameras is obtained by photographing the same calibration target, so as to obtain the rectification parameters, thereby reducing the measurement time and improving the production efficiency.

In some possible implementations, the to-be-measured workpiece is a battery cell of a power battery, and the method is used to measure a length dimension and a width dimension of the battery cell.

In the above implementations, the to-be-measured workpiece is a battery cell, and the length and width of the battery cell need to be measured. When the above method is used to measure the dimensions of the battery cell, the measurement time of the battery cell is shortened, and the production efficiency of the battery cell is improved.

According to a third aspect, an apparatus for measuring dimensions is provided. The apparatus includes: a processing unit, configured to obtain a first image and a second image of a to-be-measured workpiece. The first image and the second image are images captured by a first camera and a second camera at different positions respectively. The processing unit is further configured to extract a first corner set of the to-be-measured workpiece from the first image and a second corner set of the to-be-measured workpiece from the second image separately. The processing unit is further configured to rectify position coordinates of the first corner set and position coordinates of the second corner set to obtain a position coordinate value of the first corner set and a position coordinate value of the second corner set in a same coordinate system. The processing unit is further configured to obtain dimensions of the to-be-measured workpiece based on the position coordinate value of the first corner set and the position coordinate value of the second corner set.

In the technical solution of this application, the position coordinates of the extracted corner points are rectified directly, and subsequently, the dimensions of the to-be-measured workpiece can be determined directly based on the rectified corner position coordinates in the same coordinate system, thereby avoiding the image rectification and stitching processes, and in turn, reducing the dimension measurement time and improving the production efficiency.

In some possible implementations, the first image and the second image are images of a first region and a second region of the to-be-measured workpiece in a first direction respectively. The first corner set is a set of corners of the first region. The second corner set is a set of corners of the second region. The processing unit is configured to: obtain a dimension of the to-be-measured workpiece in the first direction based on the position coordinate value of the first corner set and the position coordinate value of the second corner set.

In the above implementations, the dimension of the to-be-measured workpiece in the first direction, for example, a length dimension of a battery cell in an extension direction of a long side of the battery cell, is determined based on the position coordinate value of the corners of the two regions of the to-be-measured workpiece. The dimensions are calculated directly based on the position coordinate value, thereby significantly reducing the measurement time and improving the production efficiency.

In some possible implementations, the first corner set includes two corners of the first region in a second direction. The second corner set includes two corners of the second region in the second direction. The second direction is perpendicular to the first direction. The processing unit is configured to: obtain a dimension of the to-be-measured workpiece in the second direction based on position coordinate values of the two corners of the first region in the second direction and/or position coordinate values of the two corners of the second region in the second direction.

In the above implementations, the dimension of the to-be-measured workpiece in the second direction, for example, a width dimension of a battery cell in an extension direction of a short side of the battery cell, can be determined based on the position coordinate value of the corners of at least one region of the to-be-measured workpiece. The dimensions are calculated directly based on the position coordinate value, thereby significantly reducing the measurement time and improving the production efficiency.

In some possible implementations, the processing unit is configured to: obtain rectification parameters of the first camera and the second camera based on a first calibration target image, a second calibration target image, and calibration target parameters, where the first calibration target image is an image captured by the first camera by photographing a calibration target that includes a calibration pattern, and the second calibration target image is an image captured by the second camera by photographing the calibration target that includes the calibration pattern; and rectify the position coordinates of the first corner set and the position coordinates of the second corner set separately based on the rectification parameters.

In the above implementations, the first camera and the second camera are calibrated by using the calibration target, so as to obtain the rectification parameters, such as a distortion parameter of the camera. In this way, the position coordinates of the corners are rectified without a need to rectify the image, thereby avoiding an image rectification process, greatly reducing the measurement time and improving the production efficiency.

In some possible implementations, the calibration pattern is a solid circle array pattern and/or a chessboard pattern.

In the above implementations, the calibration pattern may be one or more patterns, and can be compatible with to-be-measured workpieces of different sizes and models, thereby improving the production efficiency.

In some possible implementations, the calibration target is a calibration target obtained by changing a first parameter of the solid circle array pattern based on the dimensions of the to-be-measured workpiece. The first parameter includes at least one of a diameter of a solid circle, a center distance between adjacent solid circles, or a number of solid circles.

In the above implementation, the parameters of the calibration pattern may be set at discretion based on the dimensions of the to-be-measured workpiece. The calibration target can adapt to the to-be-measured workpieces of different dimensions and models by changing the diameter of the solid circle, the center distance between adjacent solid circles, the number of solid circles, and the like. The dimensions are measured after the camera is calibrated by using an appropriate calibration target, thereby reducing the measurement time and improving the production efficiency.

In some possible implementations, the rectification parameters include an intrinsic parameter and an extrinsic parameter of the first camera as well as an intrinsic parameter and an extrinsic parameter of the second camera. The intrinsic parameter of the first camera is a parameter corresponding to features of the first camera. The extrinsic parameter of the first camera is a position parameter of the first camera relative to the second camera. The intrinsic parameter of the second camera is a parameter corresponding to features of the second camera. The extrinsic parameter of the second camera is a position parameter of the second camera relative to the first camera.

In the above implementations, the principles of obtaining the rectification parameters used for rectification are provided by defining the intrinsic parameters and extrinsic parameters of the cameras, thereby facilitating subsequent measurement of dimensions.

In some possible implementations, the to-be-measured workpiece is a battery cell of a power battery, and the method is used to measure a length dimension and a width dimension of the battery cell.

In the above implementations, the to-be-measured workpiece is a battery cell, and the length and width of the battery cell need to be measured. When the above method is used to measure the dimensions of the battery cell, the measurement time of the battery cell is shortened, and the production efficiency of the battery cell is improved.

In some possible implementations, the same coordinate system is the world coordinate system.

In the above implementations, it is set that the same coordinate system is the world coordinate system, and the calculations are performed in the same world coordinate system, thereby improving the measurement precision.

According to a fourth aspect, an apparatus for measuring dimensions is provided. The apparatus includes: a processing unit, configured to obtain a first image and a second image of a to-be-measured workpiece, where the first image and the second image are images captured by a first camera and a second camera at different positions respectively. The processing unit is further configured to rectify the first image and the second image separately to obtain a first rectified image and a second rectified image. The processing unit is further configured to extract corners of the to-be-measured workpiece from the first rectified image and the second rectified image separately. The processing unit is further configured to obtain dimensions of the to-be-measured workpiece based on the corners of the to-be-measured workpiece in the first rectified image and the second rectified image.

In the technical solution of this application, the two images are rectified separately, and the dimensions are calculated after the corners in the rectified images are extracted separately, thereby avoiding an image stitching process before the corner extraction, reducing the measurement time, and improving the production efficiency.

In some possible implementations, the processing unit is configured to: determine dimensions of an overlap between the first rectified image and the second rectified image; and determine the dimensions of the to-be-measured workpiece based on the corners of the to-be-measured workpiece in the first rectified image, the corners of the to-be-measured workpiece in the second rectified image, and the dimensions of the overlap.

In the above implementations, the dimensions of the overlap are obtained, and therefore, the dimensions of the overlap can be directly subtracted in the subsequent calculation without a need to stitch the images, thereby reducing the measurement time and improving the production efficiency.

In some possible implementations, the processing unit is configured to: determine an overlap between the first rectified image and the second rectified image; crop the first rectified image and the second rectified image based on the overlap; extract the corners of the to-be-measured workpiece from the cropped first rectified image and the corners of the to-be-measured workpiece from the cropped second rectified image separately; and determine the dimensions of the to-be-measured workpiece based on the corners of the to-be-measured workpiece in the cropped first rectified image and the corners of the to-be-measured workpiece in the cropped second rectified image.

In the above implementations, the images are cropped, and the dimensions are calculated after the corners are extracted from the two cropped rectified images separately, thereby reducing the measurement time and improving the production efficiency.

In some possible implementations, the first image and the second image are images of a first region and a second region of the to-be-measured workpiece in a first direction respectively. The corners of the to-be-measured workpiece in the first rectified image include a first corner set of the first region, and the corners of the to-be-measured workpiece in the second rectified image include a second corner set of the second region. The processing unit is configured to: obtain a dimension of the to-be-measured workpiece in the first direction based on the first corner set and the second corner set.

In the above implementations, the dimension of the to-be-measured workpiece in the first direction, for example, a length dimension of a battery cell in an extension direction of a long side of the battery cell, is calculated based on the corners of the two regions of the to-be-measured workpiece, thereby significantly reducing the measurement time and improving the production efficiency.

In some possible implementations, the first corner set includes two corners of the first region in a second direction. The second corner set includes two corners of the second region in the second direction. The second direction is perpendicular to the first direction. The processing unit is configured to: obtain a dimension of the to-be-measured workpiece in the second direction based on the two corners of the first region in the second direction and/or the two corners of the second region in the second direction.

In the above implementations, the dimension of the to-be-measured workpiece in the second direction, for example, a width dimension of a battery cell in an extension direction of a short side of the battery cell, can be determined based on the corners of at least one region of the to-be-measured workpiece, thereby significantly reducing the measurement time and improving the production efficiency.

In some possible implementations, the processing unit is configured to: obtain rectification parameters of the first camera and the second camera based on a first calibration target image, a second calibration target image, and calibration target parameters, where the first calibration target image is an image captured by the first camera by photographing a calibration target that includes a calibration pattern, and the second calibration target image is an image captured by the second camera by photographing the calibration target that includes the calibration pattern; and rectify the first image and the second image separately based on the rectification parameters.

In the above implementations, the first camera and the second camera are calibrated by using the calibration target, so as to obtain the rectification parameters, such as a distortion parameter of the camera. In this way, the two images are rectified without a need to stitch the images, thereby greatly reducing the measurement time and improving the production efficiency.

In some possible implementations, the calibration pattern is a solid circle array pattern and/or a chessboard pattern.

In the above implementations, the calibration pattern may be one or more patterns, and can be compatible with to-be-measured workpieces of different sizes and models, thereby improving the production efficiency.

In some possible implementations, the calibration target is a calibration target obtained by changing a first parameter of the solid circle array pattern based on the dimensions of the to-be-measured workpiece. The first parameter includes at least one of a diameter of a solid circle, a center distance between adjacent solid circles, or a number of solid circles.

In the above implementation, the parameters of the calibration pattern may be set at discretion based on the dimensions of the to-be-measured workpiece. The calibration target can adapt to the to-be-measured workpieces of different dimensions and models by changing the diameter of the solid circle, the center distance between adjacent solid circles, the number of solid circles, and the like. The dimensions are measured after the camera is calibrated by using an appropriate calibration target, thereby reducing the measurement time and improving the production efficiency.

In some possible implementations, the rectification parameters include an intrinsic parameter and an extrinsic parameter of the first camera as well as an intrinsic parameter and an extrinsic parameter of the second camera. The intrinsic parameter of the first camera is a parameter corresponding to features of the first camera. The extrinsic parameter of the first camera is a position parameter of the first camera relative to the second camera. The intrinsic parameter of the second camera is a parameter corresponding to features of the second camera. The extrinsic parameter of the second camera is a position parameter of the second camera relative to the first camera.

In the above implementations, the principles of obtaining the rectification parameters used for rectification are provided by defining the intrinsic parameters and extrinsic parameters of the cameras, thereby facilitating subsequent measurement of dimensions.

In some possible implementations, the relative position is obtained based on the images of the same calibration target photographed by the first camera and the second camera.

In the above implementations, the relative position between the two cameras is obtained by photographing the same calibration target, so as to obtain the rectification parameters, thereby reducing the measurement time and improving the production efficiency.

In some possible implementations, the to-be-measured workpiece is a battery cell of a power battery, and the method is used to measure a length dimension and a width dimension of the battery cell.

In the above implementations, the to-be-measured workpiece is a battery cell, and the length and width of the battery cell need to be measured. When the above method is used to measure the dimensions of the battery cell, the measurement time of the battery cell is shortened, and the production efficiency of the battery cell is improved.

According to a fifth aspect, an apparatus for measuring dimensions is provided. The apparatus includes a processor and a memory. The memory is configured to store a program. The processor is configured to call the program from the memory and run the program to perform the method for measuring dimensions according to the first aspect or any one possible implementation of the first aspect, or to perform the method for measuring dimensions according to the second aspect or any one possible implementation of the second aspect.

According to a sixth aspect, a computer-readable storage medium is provided, including a computer program. When executed on a computer, the computer program causes the computer to perform the method for measuring dimensions according to the first aspect or any one possible implementation of the first aspect, or to perform the method for measuring dimensions according to the second aspect or any one possible implementation of the second aspect.

According to a seventh aspect, a computer program product that includes an instruction is provided. When executed by a computer, the instruction causes the computer to perform the method for measuring dimensions according to the first aspect or any one possible implementation of the first aspect, or to perform the method for measuring dimensions according to the second aspect or any one possible implementation of the second aspect.

BRIEF DESCRIPTION OF DRAWINGS

To describe the technical solutions of the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

DETAILED DESCRIPTION

Figure 1:
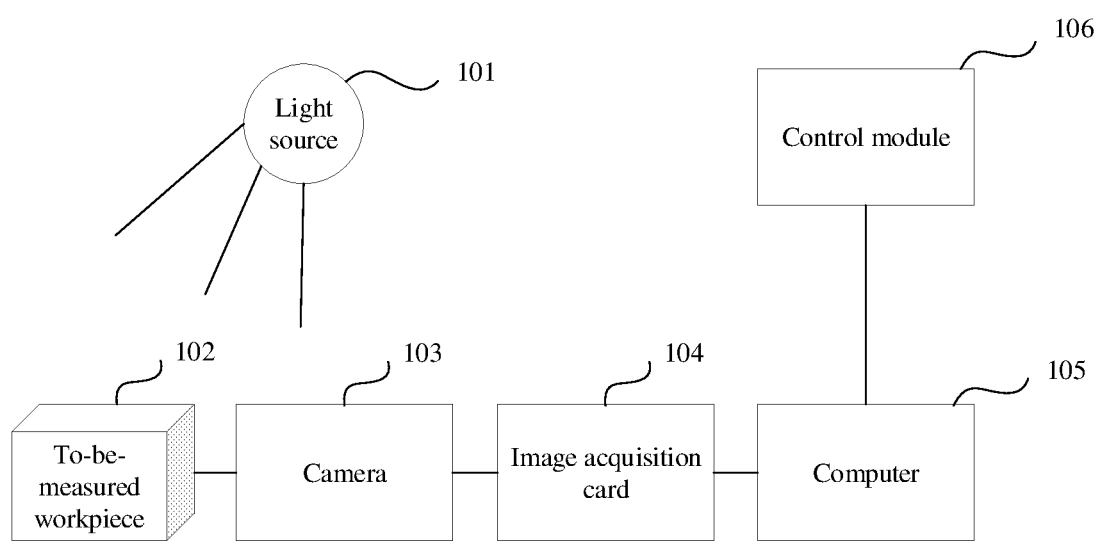
FIG. 1 is a schematic structural diagram of a machine vision system according to an embodiment of this application.

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

In the description of this application, unless otherwise specified, "a plurality of" means at least two in number; the terms such as "up", "down", "left", "right", "in", and "out" indicating a direction or a position relationship are merely intended for ease or brevity of description of this application, but do not indicate or imply that the mentioned apparatus or component is necessarily located in the specified direction or constructed or operated in the specified direction. Therefore, such terms are not to be understood as a limitation on this application. In addition, the terms "first", "second", "third", and so on are merely used for descriptive purposes, but not construed as indicating or implying relative importance. "Perpendicular" does not means exact perpendicularity, but means perpendicularity falling within an error tolerance range. "Parallel" does not mean exact parallelism, but means parallelism falling within an error tolerance range.

The directional terms appearing in the following description indicate the directions shown in the drawings, but are not intended to limit specific structures in this application. In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

Machine vision is a rapidly developing branch of artificial intelligence. To put it simply, machine vision is to make measurement and judgment by using machines instead of human eyes. A specific structure of a machine vision system is shown in FIG. 1. FIG. 1 is a schematic structural diagram of a machine vision system applicable to an embodiment of this application. As shown in FIG. 1, a machine vision system may include a light source 101, a to-be-measured workpiece 102, a camera 103, an image acquisition card 104, a computer 105, and a control module 106. The light source 101 is configured to provide lighting for the to-be-measured workpiece 102. The camera 103 is configured to capture an image of the to-be-measured workpiece 102. The image acquisition card 104 is configured to digitize the image of the to-be-measured workpiece captured by the camera and then store the digitized image of the to-be-measured workpiece, or is configured to store the digitized image of the to-be-measured workpiece captured by the camera, and transmit the digitized image of the to-be-measured workpiece to the computer. The computer 105 is configured to receive the digitized image of the to-be-measured workpiece sent by the image acquisition card 104, and then groom, analyze, and identify the image to obtain a detection result, and finally the computer 105 may transmit the obtained detection result to the control module 106. After receiving the detection result transmitted by the computer 105, the control module 106 may control the operation of the entire test process based on the detection result, and correct operation errors.

It is hereby noted that the light source 101, the to-be-measured workpiece 102, the camera 103, the image acquisition card 104, the computer 105, and the control module 106 in the machine vision system may be specifically implemented in diverse forms, without being limited in this application. For example, the light source 101 may be a visible light source, such as an incandescent lamp, a fluorescent lamp, a mercury lamp, a sodium lamp. For another example, the light source 101 may be backlighting, forward lighting, structured light, and stroboscopic lighting, or the like depending on the illumination method. To reduce the impact of the ambient light, a protective screen may be added onto the light source. For another example, the camera 103 may be a video camera. Depending on the to-be-measured workpiece, a lens of the camera may have different parameters, so as to achieve better detection effects. For another example, the image acquisition card 104 may be an image acquisition card adaptable to the camera and the computer, and so on.

With the continuous development of power batteries, the application fields of the power batteries are more extensive. Power batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. A power battery may include a battery cell, a protection circuit, and a housing. The battery cell is an important part of the power battery, the production process of the battery cell needs to be strictly controlled. For example, it is necessary to check whether the dimensions of the battery cell meets the standard. In this case, the dimensions of the battery cell need to be measured. Especially, for a large-sized battery cell, the battery cell may be measured by using a dual-camera measurement system. However, each of the images captured by two cameras shows just a part of the battery cell. In order to obtain the dimensions of the battery cell, the two images need to be stitched together before being measured. The image stitching process increases the measurement time in the entire measurement process and reduces the production efficiency.

To reduce the time for measuring the dimensions of the to-be-measured workpiece and improve the production efficiency, this application discloses a method for measuring the dimensions. Corners of the to-be-measured workpiece in the captured images are extracted, and position coordinates of the extracted corners are rectified. The position coordinates of the corners of the to-be-measured workpiece in different images are placed in the same coordinate system. The dimensions of the to-be-measured workpiece are obtained based on the position coordinate values in the same coordinate system, thereby avoiding the processes such as rectification and stitching of images, reducing the measurement time, and improving the production efficiency. Optionally, this method may be used to measure the dimensions of a battery cell of a power battery. The method not only ensures the measurement precision of the dimensions of the battery cell and reduces the measurement time, but also meets the continuously elevated production requirements, for example, the continuously elevated requirements on the production time of a single battery cell (parts per minute, PPM).

Figure 2:
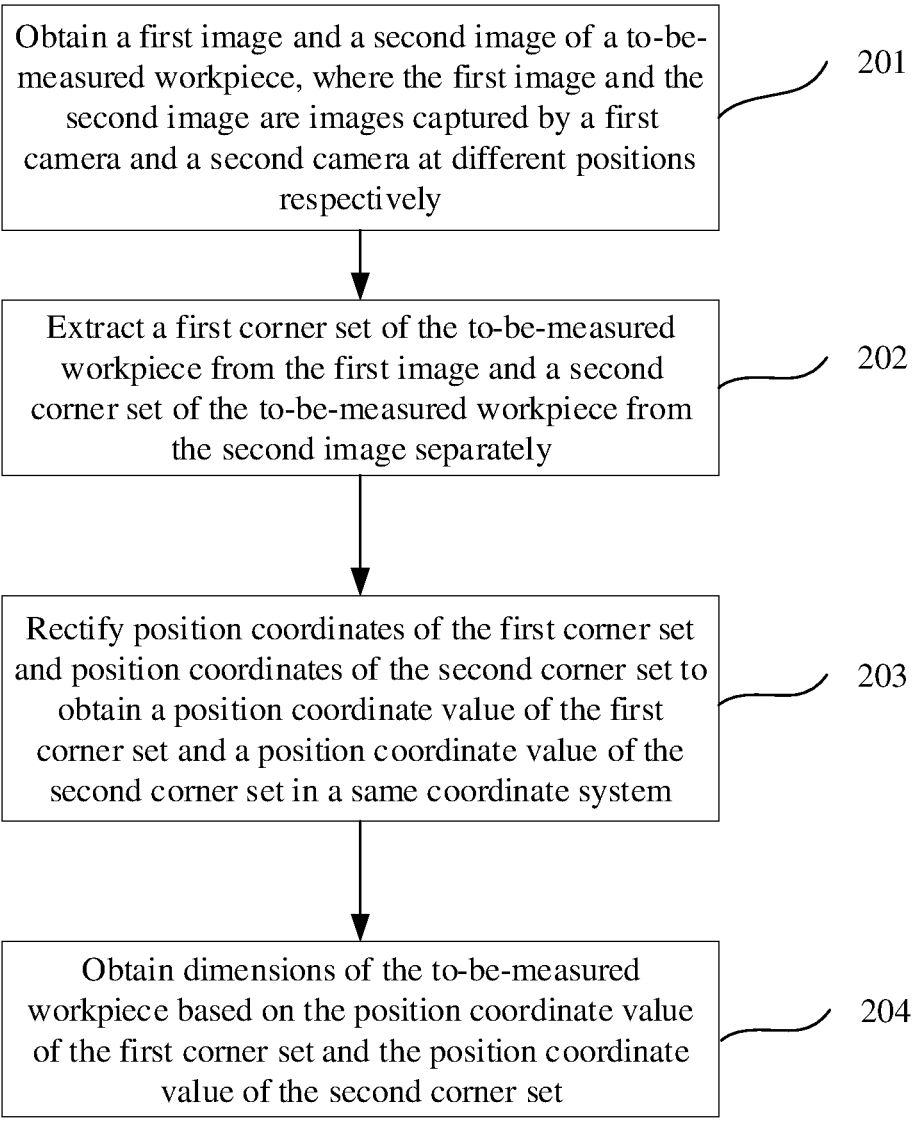
FIG. 2 is a schematic flowchart of a method for measuring dimensions according to an embodiment of this application.

FIG. 2 is a schematic flowchart of a method for measuring dimensions according to an embodiment of this application. The method 200 includes the following steps:

201. Obtaining a first image and a second image of a to-be-measured workpiece, where the first image and the second image are images captured by a first camera and a second camera at different positions respectively.

It is hereby noted that, in the implementation of this application, the to-be-measured workpiece is relatively large in size. Therefore, two cameras may be used to measure the dimensions of the to-be-measured workpiece. For example, the two cameras are the first camera and the second camera. Optionally, the two cameras may be two cameras in a binocular vision system. The shooting fields of the two cameras may overlap. In this way, after an image of a large-sized to-be-measured workpiece is captured, the image may be processed to obtain data such as overall dimensions of the to-be-measured workpiece.

202. Extracting a first corner set of the to-be-measured workpiece from the first image and a second corner set of the to-be-measured workpiece from the second image separately.

It is hereby noted that the first image and the second image are images of different parts of the to-be-measured workpiece. After corners are extracted from the two images separately, the corners of different parts of the to-be-measured workpiece can be obtained. In this way, data of the actual dimensions of the to-be-measured workpiece can be obtained based on a proportional relationship between a distance, a pixel distance in the images, and the actual dimensions, where the distance is a distance between the corners of the to-be-measured workpiece in the images.

203. Rectifying position coordinates of the first corner set and position coordinates of the second corner set to obtain a position coordinate value of the first corner set and a position coordinate value of the second corner set in a same coordinate system.

It is hereby noted that due to the characteristics of the camera and the different positions of the two cameras, the captured images are distorted, and the centers of the two images are located in different coordinate systems. Therefore, the position coordinates of the corners need to be rectified, so as to facilitate subsequent calculation in the same coordinate system and obtain the dimensions data of the to-be-measured workpiece.

204. Obtaining dimensions of the to-be-measured workpiece based on the position coordinate value of the first corner set and the position coordinate value of the second corner set.

It is hereby noted that, after the position coordinate values of the corners in the same coordinate system are obtained, the position coordinate values may be directly added and subtracted to obtain the dimensions of the to-be-measured workpiece.

Therefore, in the technical solution provided in this application, two images captured by two cameras are obtained first. Next, corners are extracted from the two images, and then the position coordinates of the corners are rectified. The position coordinate values of the corners of the to-be-measured workpiece in the two images are placed in the same coordinate system. Finally, the dimensions of the to-be-measured workpiece are obtained based on the position coordinate values in the same coordinate system, thereby avoiding the processes such as rectification and stitching of images, reducing the measurement time, and improving the production efficiency.

In this embodiment of this application, the to-be-measured workpiece in the method 200 may be a battery cell of a power battery. By measuring the length and width of the battery cell, the measurement of the thickness of the battery cell is avoided.

In step 201, optionally, the obtained first image and second image are images of a first region and a second region of the to-be-measured workpiece in a first direction respectively. It is hereby noted that the first region and the second region of the to-be-measured workpiece may overlap. In other words, the first image is a part of the image of the to-be-measured workpiece, and the second image is the other part of the image of the to-be-measured workpiece. A complete image of the to-be-measured workpiece can be obtained after the two parts of images are combined. This embodiment of this application does not limit the first direction. For example, when the to-be-measured workpiece is a battery cell, the first direction may be an extension direction of the long side of the battery cell, or the first direction may be an extension direction of the short side of the battery cell. For the description about the first direction and the second direction, reference may be made to the relevant description about FIG. 4 below.

In step 202, optionally, the first corner set may be a set of corners of the first region, and the second corner set may be a set of corners of the second region. In this case, the implementation of step 204 may be: obtaining a dimension of the to-be-measured workpiece in the first direction based on the position coordinate value of the first corner set and the position coordinate value of the second corner set. In step 202, optionally, the first corner set includes two corners of the first region in a second direction, and the second corner set includes two corners of the second region in the second direction. The second direction is perpendicular to the first direction. In this case, the implementation of step 204 may be: obtaining a dimension of the to-be-measured workpiece in the second direction based on the position coordinate value of the first corner set and/or the position coordinate value of the second corner set.

In step 202, the first corner set and the second corner set each may include at least one corner. The number of corners included in the first corner set may be the same as or different from the number of corners in the second corner set, without being limited in this application.

In this embodiment of this application, the first corner set may include two corners when the to-be-measured workpiece is a battery cell, in which the first direction is an extension direction of the long side of the battery cell and the second direction is an extension direction of the short side of the battery cell, and a line segment between the two corners is one short side of the battery cell. The second corner set may include two corners, and a line segment between the two corners is the other short side of the battery cell. A line segment between one corner in the first corner set and a corresponding corner in the second corner set is one long side of the battery cell, and a line segment between the other corner in the first corner set and a corresponding other corner in the second corner set is the other long side of the battery cell. In step 203, the rectification may be performed in diverse manners. Optionally, the rectification parameters of the first camera and the second camera are obtained based on a first calibration target image, a second calibration target image, and calibration target parameters, and finally, the position coordinates of the first corner set and the position coordinates of the second corner set are rectified based on the rectification parameters. The first calibration target image is an image captured by the first camera by photographing a calibration target that includes a calibration pattern, and the second calibration target image is an image captured by the second camera by photographing the calibration target that includes the calibration pattern.

In an optional implementation of step 203, optionally, the calibration pattern of the calibration target may be a solid circle array pattern or a chessboard pattern, without being limited in this application.

In an optional implementation of step 203, optionally, the calibration target may be a calibration target obtained by changing the first parameter of the pattern based on the dimensions of the to-be-measured workpiece. When the calibration pattern of the calibration target is a solid circle array pattern, the first parameter may include at least one of a diameter of a solid circle, a center distance between adjacent solid circles, or the number of solid circles. When the calibration pattern of the calibration target is a chessboard pattern, the first parameter may include relevant structural parameters of the chessboard pattern. In addition, the first parameter may further include structural parameters of other patterns, without being limited in this application.

In an optional implementation of step 203, optionally, the rectification parameters may include an intrinsic parameter and an extrinsic parameter of the first camera as well as an intrinsic parameter and an extrinsic parameter of the second camera. The intrinsic parameter of the first camera is a parameter corresponding to features of the first camera. The extrinsic parameter of the first camera is a position parameter of the first camera relative to the second camera. The intrinsic parameter of the second camera is a parameter corresponding to features of the second camera. The extrinsic parameter of the second camera is a position parameter of the second camera relative to the first camera.

It is hereby noted that the intrinsic parameter of the camera may include internal matrix parameters such as focal length and pixels of the camera, and may include a distortion parameter. The extrinsic parameters of the camera may include extrinsic parameters such as the position and rotation direction of the camera.

It is hereby noted that the same coordinate system in step 203 may be the world coordinate system.

This application further provides another method for measuring dimensions. In this method, two captured images are captured respectively. Corners of the to-be-measured workpiece are extracted from the two rectified images separately to obtain dimension data, without a need to stitch the two images, thereby reducing the measurement time and improving the production efficiency, as shown in the method 300 in FIG. 3. It is hereby noted that some terms and some steps mentioned in the method 300 are the same as those in the method 200 described above, and reference may be made to the detailed description in the method 200, details of which are omitted here.

Figure 3:
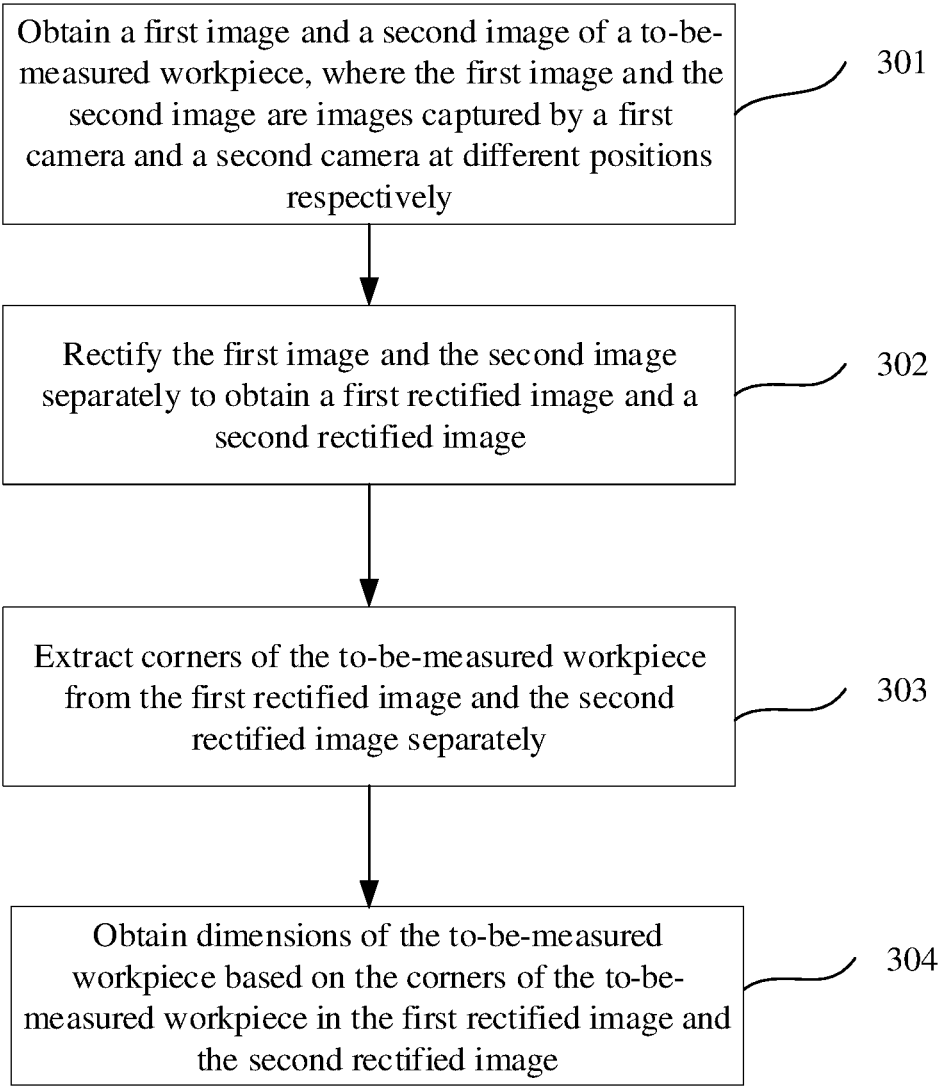
FIG. 3 is a schematic flowchart of another method for measuring dimensions according to an embodiment of this application.

FIG. 3 is a schematic flowchart of another method for measuring dimensions according to an embodiment of this application. The method 300 includes the following steps:

301. Obtaining a first image and a second image of a to-be-measured workpiece, where the first image and the second image are images captured by a first camera and a second camera at different positions respectively. For a detailed description of this step, reference may be made to the description of step 201 in the method 200 and the optional implementation of step 201, details of which are omitted here.

302. Rectifying the first image and the second image separately to obtain a first rectified image and a second rectified image.

It is hereby noted that due to the characteristics of the camera and the different positions of the two cameras, the captured images are distorted, and the centers of the two images are located in different coordinate systems. Therefore, the captured images need to be rectified.

303. Extracting corners of the to-be-measured workpiece from the first rectified image and the second rectified image separately.

It is hereby noted that the first rectified image and the second rectified image are rectified images of different parts of the to-be-measured workpiece. After corners are extracted from the two rectified images separately, the corners of different parts of the to-be-measured workpiece can be obtained. Therefore, step 304 can be performed, in which the data of the actual dimensions of the to-be-measured workpiece is obtained based on a proportional relationship between a distance, a pixel distance in the images, and the actual dimensions, where the distance is a distance between the corners of the to-be-measured workpiece in the images.

304. Obtaining dimensions of the to-be-measured workpiece based on the corners of the to-be-measured workpiece in the first rectified image and the second rectified image.

Therefore, in the technical solution provided in this application, two images captured by two cameras are obtained first. Next, the two images are rectified to obtain two rectified images. Subsequently, corners of the to-be-measured workpiece are extracted from the two rectified images separately. Finally, the dimensions of the to-be-measured workpiece are calculated based on the extracted corners, thereby avoiding an image stitching process, reducing the measurement time, and improving the production efficiency.

In step 302, optionally, the rectification may be performed in the following manner: obtaining rectification parameters of the first camera and the second camera based on a first calibration target image, a second calibration target image, and calibration target parameters, and then the first image and the second image are rectified based on the rectification parameters to obtain a first rectified image and a second rectified image. For detailed descriptions of the first calibration target image, the second calibration target image, the calibration target parameters, and the rectification parameters, reference may be made to the description of the optional embodiment of step 203 in the method 200, details of which are omitted here.

In step 303, optionally, the first rectified image is a rectified image of a first region of the to-be-measured workpiece in a first direction, and the second rectified image is a rectified image of a second region of the to-be-measured workpiece in the first direction. The two images may overlap. The percentage or dimensions of the overlap may be obtained by calibrating the cameras. Optionally, the corners of the to-be-measured workpiece in the first rectified image are a first corner set, and the first corner set may include two corners of the to-be-measured workpiece in a second direction. The corners of the to-be-measured workpiece in the second rectified image are a second corner set, and the second corner set may include two corners of the to-be-measured workpiece in the second direction. The second direction is perpendicular to the first direction. In this case, an implementation of step 304 may be: determining a dimension of the to-be-measured workpiece in the first direction based on the first corner set of the first region of the to-be-measured workpiece and the second corner set of the second region of the to-be-measured workpiece. Further, the dimension of the to-be-measured workpiece in the second direction may be determined based on the first corner set of the first region of the to-be-measured workpiece and/or the second corner set of the second region of the to-be-measured workpiece. In this embodiment of this application, step 303 and step 304 may be implemented in any one or more of the following manners:

Manner 1: Determining dimensions of an overlap between the first rectified image and the second rectified image; extracting a first corner set of the to-be-measured workpiece from the first rectified image and a second corner set of the to-be-measured workpiece from the second rectified image; and determining the dimensions of the to-be-measured workpiece based on the first corner set, the second corner set, and the dimensions of the overlap. For example, when the to-be-measured workpiece is a battery cell, the first corner set is a set of two corners, a distance between the two corners is one short side of the battery cell, and distances from the two corners to the edge of the first rectified image are the length of one part of the two long sides of the battery cell respectively. Similarly, the second corner set is a set of two corners, a distance between the two corners is the other short side of the battery cell, and distances from the two corners to the edge of the second rectified image are the length of the other part of the two long sides of the battery cell respectively. Therefore, the lengths of the corresponding long sides in the two rectified images are added, and then the dimensions of the overlap are subtracted to obtain the dimensions of the two long sides respectively. The dimension of each of the two short sides may be obtained based on the distance between the two corners in a rectified image. Optionally, the length of the battery cell may be an average of the lengths of the two long sides, and the width of the battery cell may be an average of the lengths of the two short sides.

Manner 2: Determining an overlap between the first rectified image and the second rectified image. Cropping the first rectified image and the second rectified image based on the overlap. Extracting a first corner set of the to-be-measured workpiece from the cropped first rectified image and a second corner set of the to-be-measured workpiece from the cropped second rectified image. Determining the dimensions of the to-be-measured workpiece based on the first corner set and the second corner set. For example, when the to-be-measured workpiece is a battery cell, the first corner set is a set of two corners, a distance between the two corners is one short side of the battery cell, and distances from the two corners to the edge of the first rectified image are the length of one part of the two long sides of the battery cell respectively. Similarly, the second corner set is a set of two corners, a distance between the two corners is the other short side of the battery cell, and distances from the two corners to the edge of the second rectified image are the length of the other part of the two long sides of the battery cell respectively. Therefore, the lengths of the corresponding long sides in the two rectified images are added to obtain the dimensions of the two long sides respectively. The dimension of each of the two short sides may be obtained based on the distance between the two corners in a rectified image. Optionally, the length of the battery cell may be an average of the lengths of the two long sides, and the width of the battery cell may be an average of the lengths of the two short sides.

Figure 4:
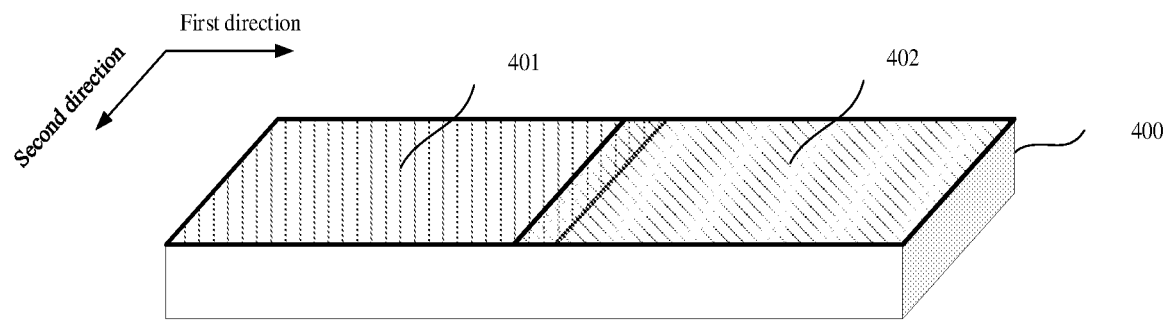
FIG. 4 is a schematic diagram of relationships between a first region, a second region, a first direction, and a second direction of a to-be-measured workpiece according to an embodiment of this application.

Using an example in which the shape of the to-be-measured workpiece is a cuboid, the following specifically describes the first region, the second region, the first direction, and the second direction in this embodiment of this application with reference to FIG. 4. FIG. 4 is a schematic diagram of relationships between a first region, a second region, a first direction, and a second direction of a to-be-measured workpiece according to an embodiment of this application.

As shown in FIG. 4, the shape of the to-be-measured workpiece 400 is a cuboid. The dimensions of the long side and the wide side of the to-be-measured workpiece 400 need to be measured. In this case, the first direction is an extension direction of the long side of the to-be-measured workpiece 400, and the second direction is an extension direction of the wide side of the to-be-measured workpiece 400. When the to-be-measured workpiece is photographed by using two cameras, the first image captured by the first camera is an image of the first region of the to-be-measured workpiece 400 in the first direction, that is, the first region is the region 401 filled with vertical stripes in FIG. 4. The second image captured by the second camera is an image of the second region of the to-be-measured workpiece 400 in the first direction, that is, the second region is the region 402 filled with oblique stripes in FIG. 4. The first region overlaps the second region. That is, an overlap region exists between the region 401 and the region 402 in FIG. 4. Therefore, after the first camera and the second camera capture the image of the first area and the image of the second region of the to-be-measured workpiece, relevant dimension data of the to-be-measured workpiece can be obtained.

The foregoing has described in detail the method embodiment according to an embodiment of this application. The following describes an apparatus embodiment according to an embodiment of this application. The apparatus embodiment corresponds to the method embodiment, and therefore, for the content not described in detail in the apparatus embodiment, reference may be made to the preceding method embodiment. The apparatus can implement any possible implementation in the foregoing method.

Figure 5:
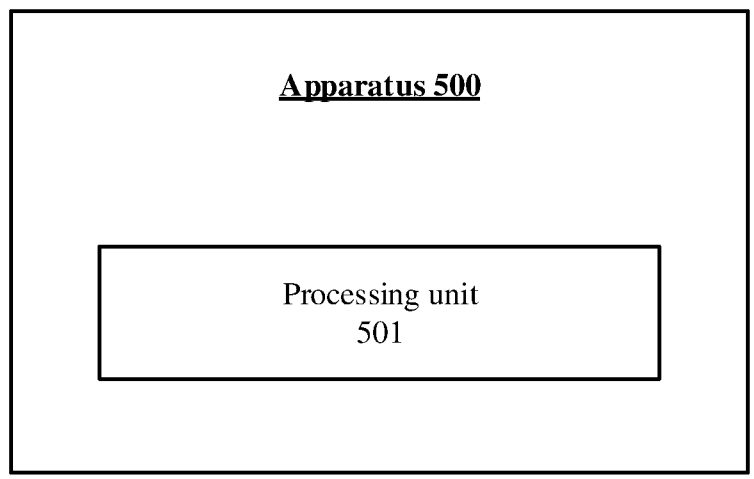
FIG. 5 is a schematic block diagram of an apparatus for measuring dimensions according to an embodiment of this application.

FIG. 5 is a schematic block diagram of an apparatus 500 for measuring dimensions according to an embodiment of this application. The apparatus 500 can perform the method for measuring dimensions according to the preceding embodiment of this application. For example, the apparatus 500 may be the computer 105, or a combination of the image acquisition card 104 and the computer 105, or a combination of the camera 103, the image acquisition card 104, and the computer 105, without being limited in this application.

As shown in FIG. 5, the apparatus includes a processing unit 501.

When the apparatus 500 performs the method 200, the processing unit 501 is configured to: obtain a first image and a second image of a to-be-measured workpiece, where the first image and the second image are images captured by a first camera and a second camera at different positions respectively; extract a first corner set of the to-be-measured workpiece from the first image and a second corner set of the to-be-measured workpiece from the second image separately; rectify position coordinates of the first corner set and position coordinates of the second corner set to obtain a position coordinate value of the first corner set and a position coordinate value of the second corner set in the same coordinate system; and obtain dimensions of the to-be-measured workpiece based on the position coordinate value of the first corner set and the position coordinate value of the second corner set.

When the apparatus 500 performs the method 300, the processing unit 501 is configured to: obtain a first image and a second image of a to-be-measured workpiece, where the first image and the second image are images captured by a first camera and a second camera at different positions respectively; rectify the first image and the second image separately to obtain a first rectified image and a second rectified image; extract corners of the to-be-measured workpiece from the first rectified image and the second rectified image separately; and obtain dimensions of the to-be-measured workpiece based on the corners of the to-be-measured workpiece in the first rectified image and the second rectified image.

For more detailed functions of the apparatus 500, reference may be made to the relevant description in the foregoing method embodiment, details of which are omitted here.

Figure 6:
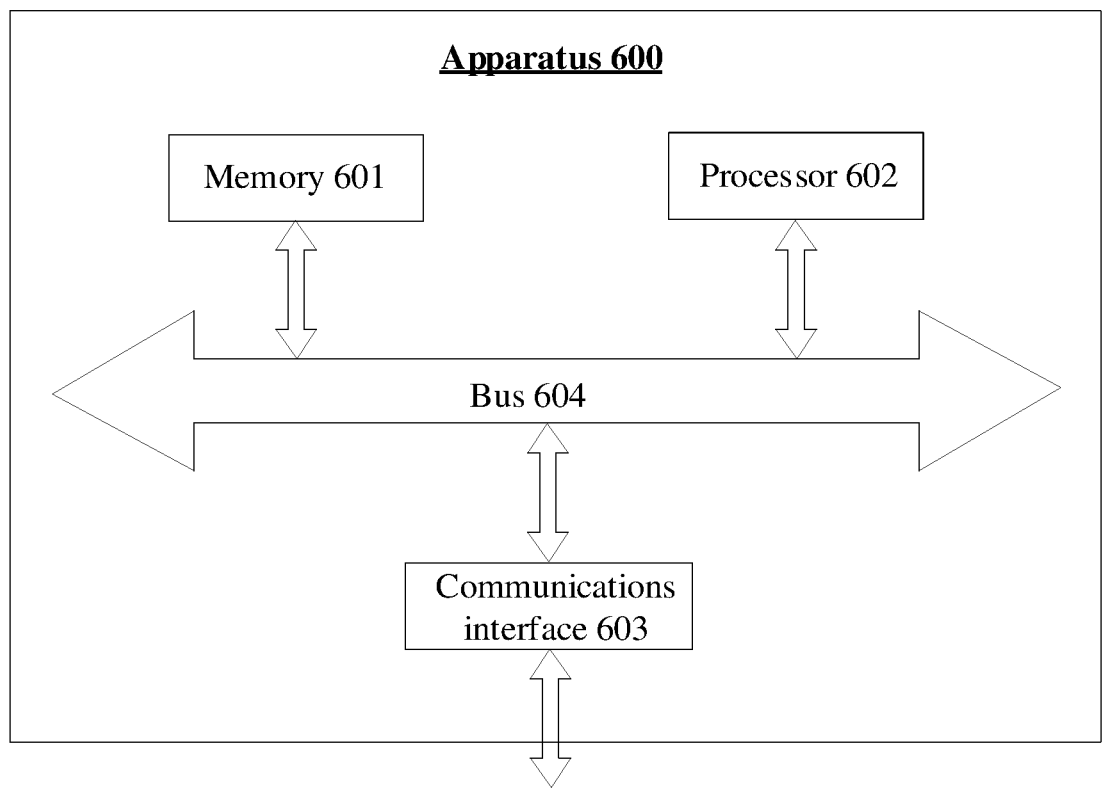
FIG. 6 is a schematic hardware structure diagram of an apparatus for measuring dimensions according to an embodiment of this application.

FIG. 6 is a schematic hardware structure diagram of an apparatus for measuring dimensions according to an embodiment of this application. The apparatus 600 for measuring dimensions in FIG. 6 includes a memory 601, a processor 602, a communications interface 603, and a bus 604. The memory 601, the processor 602, and the communications interface 603 are connected to each other by the bus 604 to implement communications connection between each other.

The memory 601 may be a read-only memory (ROM), a static storage device, or a random access memory (RAM). The memory 601 may store a program. When the program stored in the memory 601 is executed by the processor 602, the processor 602 and the communications interface 603 are configured to perform steps of method for measuring dimensions according to an embodiment of this application.

The processor 602 may be a general-purpose central processing unit (CPU), a microprocessor, an application specific integrated circuit (ASIC), a graphics processing unit (GPU), or one or more integrated circuits. The processor is configured to perform relevant programs to implement the functions of units in the apparatus for measuring dimensions according to an embodiment of this application or perform the method for measuring dimensions according to an embodiment of this application.

Alternatively, the processor 602 may be an integrated circuit chip capable of processing signals. In an implementation process, steps of the method for measuring dimensions according to an embodiment of this application may be performed by an integrated logic circuit in the hardware form or an instruction in the software form in the processor 602.

The processor 602 may be a general-purpose processor, a digital signal processor (DSP), an ASIC, a field programmable gate array (FPGA), or another programmable logic device, a discrete gate, or a transistor logic device, or a discrete hardware component. The processor can implement or perform the methods, steps, and logic block diagrams disclosed in an embodiment of this application. The general-purpose processor may be a microprocessor, or the processor may be any conventional processor or the like. The steps of the method disclosed in an embodiment of this application may be directly performed by a hardware processor, or performed by a combination of hardware and software modules in the processor. A software module may be located in a mature storage medium in the art, such as a random access memory, a flash memory, a read-only memory, a programmable read-only memory, an electrically erasable programmable memory, a register, or the like. The storage medium is located in the memory 601. The processor 602 reads the information in the memory 601, and works together with hardware to perform the functions of the units included in the apparatus for measuring dimensions according to an embodiment of this application, or perform the method for measuring dimensions according to an embodiment of this application.

The communications interface 603 may use, but without limitation, a transmitting and receiving apparatus such as a transceiver to implement communication between the apparatus 600 and another device or a communications network. For example, traffic data of an unknown device may be obtained through the communications interface 603.

The bus 604 may include a path configured to transfer information between components (for example, memory 601, processor 602, and communications interface 603) of the apparatus 600.

It is hereby noted that although the apparatus 600 shown in the drawing includes just a memory, a processor, and a communications interface, a person skilled in the art understands that the apparatus 600 in specific implementations may include other components required for normal operation. In addition, a person skilled in the art understands that the apparatus 600 may further include a hardware component configured to implement another additional function as specifically required. Moreover, a person skilled in the art understands that the apparatus 600 may include just the components necessary to implement an embodiment of this application, but without including all components shown in FIG. 6.

An embodiment of this application further provides a computer-readable storage medium configured to store program code executable by a device. The program code includes an instruction for performing the steps in the method for measuring dimensions.

An embodiment of this application further provides a computer program product. The computer program product includes a computer program stored on a computer-readable storage medium. The computer program includes a program instruction. When executed on a computer, the program instruction causes the computer to perform the method for measuring dimensions.

The computer-readable storage medium may be a transitory computer-readable medium or a non-transitory computer-readable storage medium.

A person skilled in the art is clearly aware that for convenience and brevity of description, a detailed working process of the apparatus described above may be learned by referring to the corresponding process in the foregoing method embodiment, details of which are omitted here.

In the several embodiments provided in this application, it is understandable that the disclosed apparatus and method may be implemented in other manners. For example, the described apparatus embodiment is merely illustrative. For example, the division of the apparatus into several units is merely a type of logic function division, and the apparatus may be divided in other manners in practical implementations. For example, a plurality of units or components may be combined or integrated into another system, or some features may be ignored or skipped. In addition, the displayed or discussed mutual couplings or direct couplings or communications connections may be implemented through some interfaces. The indirect couplings or communications connections between the apparatuses or units may be implemented in electronic, mechanical or other forms.

The terms used herein are merely used to describe an embodiment but not to limit the claims. Unless otherwise expressly specified in the context, a noun in the singular form preceded by "a", "an", or "the" used in the description of an embodiment or claims is intended to include the plural form of the noun. Similarly, the term "and/or" used herein means any and all possible combinations of one or more relevant items recited. In addition, when used in this application, the terms "include" and "comprise" mean the presence of stated features, entirety, steps, operations, elements, and/or components, but without excluding the presence or addition of one or more other features, entirety, steps, operations, elements, components, and/or any combination thereof.

The aspects, implementation manners, implementations, or features in a described embodiment can be used alone or in any combination. Each aspect of an embodiment described herein may be implemented by software, hardware, or a combination of hardware and software. The described embodiment may be embodied by a computer-readable medium that stores computer-readable code. The computer-readable code includes an instruction executable by at least one computing apparatus. The computer-readable medium may be correlated with any data storage apparatus capable of storing data that is readable by a computer system. Examples of the computer-readable media may include a read-only memory, a random-access memory, a compact disc read-only memory (CD-ROM), a hard disk drive (HDD), a digital video disc (DVD), magnetic tape, an optical data storage device, and the like. The computer-readable medium may be distributed in a computer system connected over a network so that the computer-readable code can be stored and executed in a distributed manner.

The foregoing technical description may be read by reference to the drawings appended hereto. The drawings form a part hereof and have illustrated the implementations in accordance with the described embodiments. Although the embodiments are described in sufficient detail to enable a person skilled in the art to implement the embodiments, the embodiments are non-restrictive so that other embodiments can be used, and changes may be made to the embodiments without departing from the scope of the described embodiments. For example, the order of operations illustrated in a flowchart is non-restrictive, and therefore, the order of two or more operations illustrated in the flowchart and described with reference to the flowchart may be changed according to several embodiments. As another example, in several embodiments, one or more operations illustrated in the flowchart and described with reference to the flowchart are optional or deletable. In addition, some steps or functions may be added to and embodiment disclosed herein, or the order between two or more steps may be permuted. All such variations are considered to be included in the disclosed embodiments and claims.

In addition, terms are used in the foregoing technical description to enable a thorough understanding of the described embodiments. However, undue detail is not required to implement the described embodiments. Therefore, the foregoing description of embodiments is rendered for purposes of interpretation and description. The embodiments rendered in the foregoing description and the examples disclosed according to such embodiments are provided separately to add a context for ease of understanding of the described embodiments. The specification described above is not intended to be exhaustive or to limit the described embodiments to a precise form of this application. Several modifications, alternatives, and variations may be made based on the foregoing teachings. In some circumstances, well-known process steps have not been described in detail in order not to unnecessarily obscure the described embodiments. Although this application has been described with reference to illustrative embodiments, various improvements may be made to the embodiments without departing from the scope of this application, and the components in this application may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A method for measuring dimensions, comprising:
   obtaining a first image and a second image of a to-be-measured workpiece, wherein the first image and the second image are images captured by a first camera and a second camera at different positions, respectively;
   extracting a first corner set of the to-be-measured workpiece from the first image and a second corner set of the to-be-measured workpiece from the second image, respectively;

rectifying position coordinates of the first corner set and position coordinates of the second corner set, to obtain a position coordinate value of the first corner set and a position coordinate value of the second corner set in a same coordinate system; and obtaining dimensions of the to-be-measured workpiece based on the position coordinate value of the first corner set and the position coordinate value of the second corner set;

wherein rectifying position coordinates of the first corner set and position coordinates of the second corner set comprises:

obtaining rectification parameters of the first camera and the second camera using a calibration target; and rectifying the position coordinates of the first corner set and the position coordinates of the second corner set separately based on the rectification parameters, to obtain the position coordinate value of the first corner set and the position coordinate value of the second corner set in the same coordinate system;

wherein the calibration target comprises a solid circle array pattern and a first parameter of the solid circle array pattern is varied depending on the dimensions of the to-be-measured workpiece; and wherein the first parameter comprises at least one of a diameter of a solid circle, a center distance between adjacent solid circles, or a number of solid circles.

2. The method according to claim 1, wherein the first image and the second image are images of a first region and a second region of the to-be-measured workpiece in a first direction respectively, the first corner set is a set of corners of the first region, the second corner set is a set of corners of the second region, and wherein obtaining dimensions of the to-be-measured workpiece based on the position coordinate value of the first corner set and the position coordinate value of the second corner set comprises:

obtaining a dimension of the to-be-measured workpiece in the first direction based on the position coordinate value of the first corner set and the position coordinate value of the second corner set.

3. The method according to claim 2, wherein the first corner set comprises two corners of the first region in a second direction, the second corner set comprises two corners of the second region in the second direction, the second direction is perpendicular to the first direction, and wherein obtaining dimensions of the to-be-measured workpiece based on the position coordinate value of the first corner set and the position coordinate value of the second corner set comprises:

obtaining a dimension of the to-be-measured workpiece in the second direction based on position coordinate values of the two corners of the first region in the second direction and/or position coordinate values of the two corners of the second region in the second direction.

4. The method according to claim 1, wherein obtaining the rectification parameters of the first camera and the second camera using the calibration target comprises:

obtaining the rectification parameters of the first camera and the second camera based on a first calibration target image, a second calibration target image, and parameters of the calibration target, wherein the first calibration target image is an image of the calibration target captured by the first camera, and the second calibration target image is an image of the calibration target captured by the second camera.

5. The method according to claim 4, wherein the rectification parameters comprise an intrinsic parameter and an extrinsic parameter of the first camera as well as an intrinsic parameter and an extrinsic parameter of the second camera, the intrinsic parameter of the first camera is a parameter corresponding to features of the first camera, the extrinsic parameter of the first camera is a position parameter of the first camera relative to the second camera, the intrinsic parameter of the second camera is a parameter corresponding to features of the second camera, and the extrinsic parameter of the second camera is a position parameter of the second camera relative to the first camera.

6. The method according to claim 1, wherein the to-be-measured workpiece is a battery cell of a power battery, and the method is used to measure a length dimension and a width dimension of the battery cell.

7. An apparatus for measuring dimensions, comprising a processing unit, wherein the processing unit is configured to:

obtain a first image and a second image of a to-be-measured workpiece, wherein the first image and the second image are images captured by a first camera and a second camera at different positions, respectively;

extract a first corner set of the to-be-measured workpiece from the first image and a second corner set of the to-be-measured workpiece from the second image, respectively;

rectify position coordinates of the first corner set and position coordinates of the second corner set, to obtain a position coordinate value of the first corner set and a position coordinate value of the second corner set in a same coordinate system; and obtain dimensions of the to-be-measured workpiece based on the position coordinate value of the first corner set and the position coordinate value of the second corner set;

wherein in rectifying position coordinates of the first corner set and position coordinates of the second corner set, the processing unit is configured to:

obtain rectification parameters of the first camera and the second camera using a calibration target; and rectify the position coordinates of the first corner set and the position coordinates of the second corner set separately based on the rectification parameters, to obtain the position coordinate value of the first corner set and the position coordinate value of the second corner set in the same coordinate system;

wherein the calibration tar et comprises a solid circle array pattern, and a first parameter of the solid circle array pattern is varied depending on the dimensions of the to-be-measured workpiece; and wherein the first parameter comprises at least one of a diameter of a solid circle, a center distance between adjacent solid circles, or a number of solid circles.

8. The apparatus according to claim 7, wherein the first image and the second image are images of a first region and a second region of the to-be-measured workpiece in a first direction respectively, the first corner set is a set of corners of the first region, the second corner set is a set of corners of the second region, and the processing unit is configured to:

obtain a dimension of the to-be-measured workpiece in the first direction based on the position coordinate value of the first corner set and the position coordinate value of the second corner set.

9. The apparatus according to claim 8, wherein the first corner set comprises two corners of the first region in a second direction, the second corner set comprises two corners of the second region in the second direction, the second direction is perpendicular to the first direction, and the processing unit is configured to:

obtain a dimension of the to-be-measured workpiece in the second direction based on position coordinate values of the two corners of the first region in the second direction and/or position coordinate values of the two corners of the second region in the second direction.

10. The apparatus according to claim 7, wherein in obtaining the rectification parameters of the first camera and the second camera using the calibration target, the processing unit is configured to:
obtain the rectification parameters of the first camera and the second camera based on a first calibration target image, a second calibration target image, and parameters of the calibration target,
wherein the first calibration target image is an image of the calibration target captured by the first camera, and the second calibration target image is an image captured by the second camera.

11. The apparatus according to claim 10, wherein the rectification parameters comprise an intrinsic parameter and an extrinsic parameter of the first camera as well as an intrinsic parameter and an extrinsic parameter of the second camera, the intrinsic parameter of the first camera is a parameter corresponding to features of the first camera, the extrinsic parameter of the first camera is a position parameter of the first camera relative to the second camera, the intrinsic parameter of the second camera is a parameter corresponding to features of the second camera, and the extrinsic parameter of the second camera is a position parameter of the second camera relative to the first camera.

12. The apparatus according to claim 7, wherein the to-be-measured workpiece is a battery cell of a power battery, and the method is used to measure a length dimension and a width dimension of the battery cell.

13. A non-transitory computer-readable storage medium storing a computer program thereon for execution by a processor of a computer, wherein when executed, the computer program causes the computer to perform operations that comprise:

obtaining a first image and a second image of a to-be-measured workpiece, wherein the first image and the second image are images captured by a first camera and a second camera at different positions, respectively;

extracting a first corner set of the to-be-measured workpiece from the first image and a second corner set of the to-be-measured workpiece from the second image, respectively;

rectifying position coordinates of the first corner set and position coordinates of the second corner set, to obtain a position coordinate value of the first corner set and a position coordinate value of the second corner set in a same coordinate system; and obtaining dimensions of the to-be-measured workpiece based on the position coordinate value of the first corner set and the position coordinate value of the second corner set;

wherein rectifying position coordinates of the first corner set and position coordinates of the second corner set comprises:

obtaining rectification parameters of the first camera and the second camera using a calibration target; and rectifying the position coordinates of the first corner set and the position coordinates of the second corner set separately based on the rectification parameters, to obtain the position coordinate value of the first corner set and the position coordinate value of the second corner set in the same coordinate system;

wherein the calibration target comprises a solid circle array pattern, and a first parameter of the solid circle array pattern is varied depending on the dimensions of the to-be-measured workpiece; and wherein the first parameter comprises at least one of a diameter of a solid circle, a center distance between adjacent solid circles, or a number of solid circles.

* * * * *